Nov. 15, 1927.  1,649,646
G. J. BADGLEY
MEANS FOR ADJUSTABLY MOUNTING AN OPTICAL COMBINATION
Filed May 23, 1924
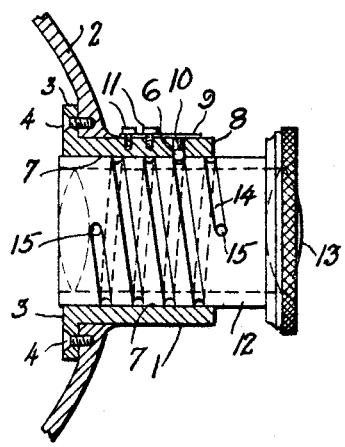
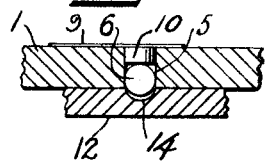 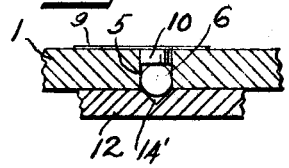
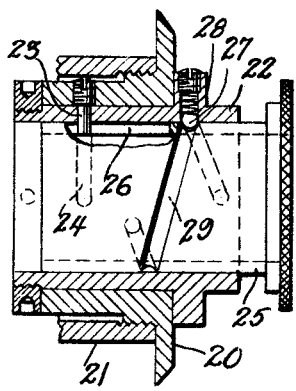 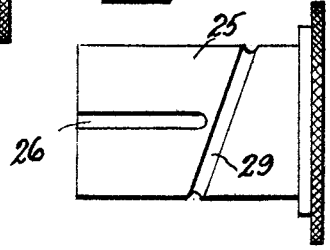 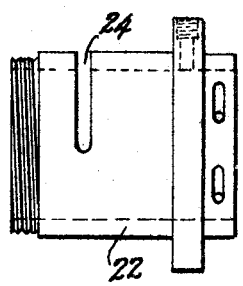
INVENTOR
Gerald J. Badgley
BY
Lewis J. Doolittle
ATTORNEY Patented Nov. 15, 1927.

1,649,646

UNITED STATES PATENT OFFICE.

GERALD J. BADGLEY, OF BROOKLYN, NEW YORK, ASSIGNOR TO DUPLEX MOTION PICTURE INDUSTRIES, INC., A CORPORATION OF DELAWARE.

MEANS FOR ADJUSTABLY MOUNTING AN OPTICAL COMBINATION.

Application filed May 23, 1924. Serial No. 715,354.

This invention relates to means for adjustably mounting an optical combination, and the object of the invention is the provision of an improved mechanism of this class having simplified construction and greater efficiency and susceptible of more rapid and exact adjustment than has been possible heretofore with the mechanisms employed for this purpose.

An important object of the invention is the provision of an improved device of the class specified embodying means for rapid focal adjustment of an optical combination and ready interchange thereof, in which manual pressure in or out on the combination will immediately effect approximately accurate focusing thereof, after which more exact focal adjustment may be effected by a spiral turning of said combination relatively to the optical apparatus. Also interchange of combinations may be effected by withdrawing a mounted combination and inserting another in place thereof, after which any necessary adjustment thereof may be made.

An object of the present invention is the provision of a focusing device for optical combinations in which a spring-pressed ball or equivalent means is adapted to coact with a spiral groove on an optical element to effect rapid and accurate focal adjustment thereof and to hold said optical element firmly in its adjusted position.

A further object of the invention is the provision of focusing means for an optical combination, so devised that the optical element will be maintained in optical axial alinement during focal adjustment thereof.

A feature of the invention relates to spring-pressure means on an optical apparatus so arranged that a ball or equivalent element will be pressed against and will protrude above a seat for coaction with a spiral groove on an optical element.

Other features relate to means for limiting the movement of an optical element relatively to the apparatus, and to mechanism embodying specific types of spiral grooves adapted for coaction with a spring-pressed ball element.

The foregoing and other features of the invention not hereinbefore referred to will be hereinafter described and claimed and are illustrated in the accompanying drawing, in which Figure 1 is a vertical section of an optical combination and associated parts, embodying improved means for adjustably mounting an optical combination on an optical apparatus.

Fig. 2 is an enlarged detail illustrating a preferred form of spiral groove on an optical combination adapted for coaction with a spring-pressed ball;

Fig. 3 is a similar view of another form of spiral groove and coacting spring-pressed ball element;

Fig. 4 is a vertical section of an embodiment of the invention in which the mount carrying an optical element is adapted for axial movement longitudinally to effect focal adjustment;

Fig. 5 is a detail view in side elevation of a sleeve member adapted for spiral movement and interposed between the optical combination and the apparatus, as shown in Fig. 4, and Fig. 6 is a detail view in side elevation of the optical combination of Fig. 4.

Referring to the drawings, 1 designates a bushing adapted to be mounted, relatively to an optical apparatus, in an opening in the casing 2, (Fig. 1) a flange 3 on the bushing 1 permitting attachment to the casing, as by means of screws 4 or other suitable devices. As here shown the bushing 1 has a recess 5 formed therein, said recess being so tapered or otherwise formed as to provide a receptacle for a ball 6 with a seat at its inner end to prevent the ball from falling out when the parts are not assembled, or being changed, while at the same time allowing said ball to protrude somewhat from the inner face 7 thereof. Said recess 5 may be located at any point in the bushing 1, but preferably is placed near the outer end 8 thereof. For effecting pressure on the ball 6 there is shown, Figs. 1–3, a spring tongue 9 adapted to exert such pressure on a removable pin 10 contacting with the ball 6, though it will be understood that any type of spring actuated catch may be employed to effect the object stated. As shown, the spring 9 is secured, as by screws 11 or equivalent means, to the outer face of the bushing 1, while said spring is free at its other end to exert the desired calculated pressure upon the ball 6. By employment of the means set forth it will be seen that when the ball 6 and pin 10 inserted in aperture 5 in the bushing 1 and the spring 9 is secured in place, said ball 6 will be yieldingly held and will protrude somewhat into the slot 14 of the adjustable element 12.

An adjustable element for an optical combination is shown at 12 (Figs. 1-3) and is adapted for insertion into and coaction with the bushing 1 and the spring-pressed element carried thereby, this element 12 being illustrated as cylindrical and adapted to have a frictional or sliding fit within said bushing 1 and also being adapted for advancement therein or withdrawal therefrom longitudinally by manual pressure thereon in one or the other direction to effect preliminary focusing of an optical element 13 carried by the adjustable element 12. To effect thereafter a more exact focusing of the element 13, I have shown a spiral groove 14 formed on the outer surface of the adjustable element 12, which groove may be made of as deep or as shallow section as may be required to effect the purpose desired. Said groove is shown as of somewhat deeper section than the coacting ball surface, so that the ball rolls easily either along the groove or into and out of the same when manual pressure is exerted in a longitudinal direction. The lead of the groove 14 may be such as may be desired in any particular case.

In operation, the optical element 12, having mounted therein the lens 13, upon its introduction into the bushing 1, may be pushed forward longitudinally, this action depressing the ball 6 which rolls over the surface of the bushing, until the groove 14 reaches the spring-pressed ball 6, whereupon the action of said spring 9 forces said ball 6 into the groove 14. Turning of the optical element 12 spirally to the right will now cause said element to advance within the bushing 1, the rate of said advance depending upon the lead of the groove 14 and the rapidity of the turning movement. When by said turning movement the lens has been brought to exact focus it will be held positively in that exact position until re-focusing is required or a new optical element is to be inserted, this positive and exact holding being effected by the pressure of the ball 6 tending to prevent any movement either back and forth or in a spiral direction. By the means just described removal and replacement of optical elements may be effected rapidly, and exact focal adjustment of a lens quickly made, and with the means employed herein this adjustment will not be disturbed by any ordinary handling of the optical apparatus.

I have shown at each end of the spiral groove 14 a seat or pocket 15 adapted to permit the ball 6 to seat therein when the optical element 12 has been moved to its extreme limit of spiral adjustment.

In Figs. 4, 5 and 6 there is shown a modification of adjustable mounting means for optical combinations, this form of construction possessing advantages in cases where optical axial alinement without deviation must be accurately maintained during focal adjustment. As each lens varies in density in different portions thereof, it has been found necessary when extremely accurate focal adjustment must be made and maintained, to advance or withdraw the lens along its axial line without any turning movement of the lens itself. The means employed herein and shown in Figs. 4-6 for this purpose comprise a bushing 20 fixed in the casing 21 of an optical apparatus. Carried within said bushing 20 is a sleeve 22 adapted to have a turning movement therein but held against longitudinal or axial movement, this being effected by a pin 23 secured to the bushing 20 and adapted for cooperation with a slot 24 in the sleeve 22. It will be seen that by the means shown and described turning movement of the sleeve 23 in the bushing 20 will be effected. On a lens-carrying element 25 I have shown a channel 26 also cooperating with the pin 23, the lower end of said pin being adapted to seat itself in movement of said channel, whereby said element 25 with be directed in an axial or longitudinal direction. The sleeve 22 has formed therein a valve-seat carrying therein a ball 27 spring-pressed by the spring 28 to cause it to project beyond the inner surface of the sleeve 22. For coaction with said spring-pressed ball 27 I have shown a spiral groove 29 formed on the outer face of the lens-carrying element 25. This groove 29 ordinarily will permit somewhat less than one complete rotation of the sleeve 22, but this will be sufficient to effect the necessary focal adjustment of the lens at all times. It will be clear that upon the turning of the sleeve 22 the pin 23 will travel in the slot 24 and hold said sleeve against longitudinal axial movement. The ball 27 spring-pressed into the groove 29 will, upon rotation of the sleeve 22, cause the lens-tube 25 to be moved longitudinally in an axial direction, any turning of said tube and its lens being prevented through the action of the pin 23 in the channel 26. The movement of such lens-tube 25 is therefore an axial movement in a straight line.

In the form shown in Figs. 4-6, as in the form shown in Figs. 1, 2 and 3, the groove 29 of the device adapted to cooperate with the spring-pressed ball, is of a cross section such as to cause very accurate positioning of the elements by reason of the positive holding of the ball in said groove, and this positive holding effect will tend to increase with use. The groove 29 as shown being of deeper section than the surface of the contacting ball, such ball will contact with the upper outer edges of the groove and will not seat on the lower portion of the groove. The tendency will be for the ball to seat more firmly in said groove the longer the device is operated, continued use thus adding to the effectiveness of this portion of the mechanism. Fig. 2 illustrates a ball guide as just described, in which the groove 14 is of such form as to furnish a trough for the ball that is of deeper section than the surface of the ball, the ball surface thus traveling in contact with only the edge portions of the groove. Fig. 3 illustrates a form of groove 14' triangular in cross section, and adapted for cooperation with the ball 6 in a manner somewhat similar to that of Fig. 2.

As many changes could be made in the above construction and many apparently widely different embodiments of my invention designed without departing from the scope of the appended claims, I intend that all matter contained in the above description or shown in the accompanying drawings shall be interpreted as illustrative merely of an operative embodiment of my invention and not in a limiting sense.

What I claim is:—

1. Means for adjustably mounting optical combinations, comprising a member carried by an optical apparatus, a coacting lens-carrying member adapted to be inserted in and to be moved back and forth within said first member, one of said members being provided with a ball receptacle, a spring-pressed ball positioned in said receptacle and normally protruding from one end thereof and adapted to be depressed from its seat, a resilient element mounted adjacent one end of said ball receptacle, a ball positioned in said receptacle in operative engagement with said resilient element, a spiral groove on the contacting surface of the other member adapted to coact with the spring-pressed ball to permit movement of the lens-carrying member to focus the lens and a depressed pocket at each end of said spiral groove adapted to receive said spring-pressed ball and thereby limit movement of the lens-carrying member.

2. Means for adjustably mounting optical combinations, embodying a tubular member carried by an optical apparatus, a lens-carrying member adapted to be inserted in and to be moved back and forth within said first member, said tubular member being provided with a ball receptacle, a spring-pressed element mounted adjacent said ball receptacle, a ball positioned in said receptacle in operative engagement with said spring pressed element and normally protruding above the inner surface thereof and adapted to be depressed from its seat, a spiral groove on the contacting outer surface of the lens-carrying member adapted to coact with said spring-pressed ball to permit adjustment of the lens-carrying member to focus the lens, and a depressed pocket at each end of said spiral groove adapted to receive said spring-pressed ball and thereby limit movement of the lens-carrying member.

3. Means for adjustably mounting optical combinations, comprising a member carried by an optical apparatus, a coacting lens-carrying member adapted to be inserted in and to be moved back and forth within said first member, a spring-pressed ball seated in one of said members and normally protruding from the surface thereof and adapted to be depressed from its seat, said member being provided with a ball receptacle, a spring pressed element mounted adjacent one end of said ball receptacle, and a spiral groove on the contacting surface of the other member adapted to coact with the spring-pressed ball to permit movement of the lens-carrying member to focus the lens, the surface of said ball being of shallower section than the groove surface.

4. Means for adjustably mounting optical combinations, comprising a member carried by an optical apparatus, a coacting lens-carrying member adapted to be inserted in and to be moved back and forth within said first member, one of said members being provided with a ball receptacle, a spring-pressed ball positioned in said receptacle and normally protruding from the surface thereof and adapted to be depressed from its seat, a resilient member mounted adjacent one end of said ball receptacle in operative engagement with the ball therein, and a spiral groove on the contacting surface of the other member adapted to coact with the spring-pressed ball to permit movement of the lens-carrying member to focus the lens, said groove having its opposite walls angularly disposed to each other.

5. Means for adjustably mounting optical combinations, comprising a sleeve carried by an optical apparatus, means for permitting turning movement of said sleeve, and an optical combination carried by said sleeve and having means thereon adapted to coact with means on the sleeve to effect longitudinal movement and prevent rotary movement of the combination when the sleeve is turned.

6. Means for adjustably mounting optical combinations, comprising a sleeve carried by an optical apparatus, means for permitting turning movement of said sleeve, means for preventing longitudinal movement thereof, an optical combination mounted in said sleeve and having means thereon adapted to coact with means on the sleeve to effect longitudinal movement and prevent rotary movement of the combination when the sleeve is turned.

7. Means for adjustably mounting optical combinations, comprising a sleeve mounted upon an optical apparatus, a guideway in said sleeve, a fixed member on the apparatus adapted to travel in said guideway to prevent longitudinal movement of the sleeve while permitting turning movement thereof, an optical combination mounted in said sleeve and having a guideway therein adapted for coaction with said fixed member to permit longitudinal movement of the combination and to prevent rotary movement thereof, and a spiral groove on the surface of said combination adapted for coaction with means on said sleeve to effect longitudinal movement of the combination.

8. Means for adjustably mounting optical combinations, comprising a sleeve mounted upon an optical apparatus, a guideway in said sleeve, a fixed member on the apparatus adapted to move in said guideway to prevent longitudinal movement of the sleeve while permitting turning movement thereof, an optical combination mounted in said sleeve and having a guideway therein adapted for coaction with said fixed member to permit longitudinal movement of the combination and to prevent rotary movement thereof, a spring-pressed ball carried by said sleeve and normally protruding from the inner surface thereof, and a spiral groove on the surface of the optical combination adapted for coaction with said spring-pressed ball to effect longitudinal movement of the combination.

Signed at New York, in the county of New York, and State of New York, this 2nd day of May, A. D. 1924.

GERALD J. BADGLEY.